US009063916B2

(12) United States Patent
Thukkaram et al.

(10) Patent No.: US 9,063,916 B2
(45) Date of Patent: Jun. 23, 2015

(54) COMPACT ENCODING OF NODE LOCATIONS

(71) Applicant: Oracle International Corporation, Redwood Shores, CA (US)

(72) Inventors: Prabhu Thukkaram, San Ramon, CA (US); Michal Chmielewski, San Jose, CA (US); Horst Heistermann, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 68 days.

(21) Appl. No.: 13/779,643

(22) Filed: Feb. 27, 2013

(65) Prior Publication Data

US 2014/0245269 A1    Aug. 28, 2014

(51) Int. Cl.
 G06F 9/44    (2006.01)
 G06F 17/00   (2006.01)
 G06F 17/30   (2006.01)
 G06F 17/22   (2006.01)
 G06F 11/36   (2006.01)

(52) U.S. Cl.
 CPC ........ *G06F 17/2252* (2013.01); *G06F 17/2247* (2013.01); *G06F 11/3624* (2013.01)

(58) Field of Classification Search
 CPC ............... G06F 8/10; G06F 8/20; G06F 8/34; G06F 8/44; G06F 11/362
 See application file for complete search history.

(56) References Cited

U.S. PATENT DOCUMENTS

| 4,797,887 | A  | * | 1/1989  | Yamasaki et al. ............ 714/791 |
| 5,151,697 | A  | * | 9/1992  | Bunton .......................... 341/51 |
| 5,329,536 | A  | * | 7/1994  | Darmon et al. ............... 714/794 |
| 5,749,095 | A  | * | 5/1998  | Hagersten ..................... 711/141 |
| 5,873,087 | A  | * | 2/1999  | Brosda et al. ......................... 1/1 |
| 6,343,291 | B1 | * | 1/2002  | Goldman ....................... 707/802 |
| 6,795,962 | B1 | * | 9/2004  | Hanson ......................... 717/129 |
| 6,981,203 | B2 | * | 12/2005 | Mills ............................ 714/794 |
| 7,131,010 | B2 | * | 10/2006 | Okaue et al. .................. 713/189 |
| 7,290,208 | B2 | * | 10/2007 | Saborowski et al. ......... 715/234 |
| 7,362,909 | B2 | * | 4/2008  | Watanabe et al. ............. 382/240 |
| 7,430,509 | B2 | * | 9/2008  | Jost et al. ...................... 704/243 |
| 7,467,157 | B1 | * | 12/2008 | Chen et al. ......................... 1/1 |

(Continued)

OTHER PUBLICATIONS

Raghu R. Kodali, What is service-oriented architecture? An introduction to SOA, published by JavaWorld, Jun. 13, 2005, pp. 1-6.*

(Continued)

*Primary Examiner* — Tuan Q. Dam
*Assistant Examiner* — Zheng Wei
(74) *Attorney, Agent, or Firm* — Kilpatrick, Townsend & Stockton, LLP

(57) ABSTRACT

Techniques for encoding node locations are provided. In some examples, a node in a hierarchy such as a document object model (DOM) may be expressed as a location path from the root node of the hierarchy to the node. Each node on the location path may be encoded using a mapping between the type and/or index of the node and a set of characters such as ASCII characters. The encoding of each node on the path be concatenated to form the encoded location path. The encoding seeks to minimize the length of the encoded location path. For example, in an embodiment, a single ASCII character may be used to encode both the type and the index of a node. In an embodiment, breakpoint locations may be encoded using methods provided to reduce storage and computing resource required.

18 Claims, 9 Drawing Sheets

(56) References Cited

U.S. PATENT DOCUMENTS

| | | | |
|---|---|---|---|
| 7,620,641 B2* | 11/2009 | Nguyen et al. | 1/1 |
| 7,882,109 B2* | 2/2011 | Lassalle | 707/741 |
| 7,886,223 B2* | 2/2011 | Shetty et al. | 715/234 |
| 7,937,413 B2* | 5/2011 | Tran et al. | 707/803 |
| 8,117,288 B2* | 2/2012 | Bhanot et al. | 709/220 |
| 8,156,412 B2* | 4/2012 | Lin et al. | 714/786 |
| 8,421,654 B2* | 4/2013 | Othman et al. | 341/107 |
| 8,434,056 B2* | 4/2013 | Windley et al. | 717/106 |
| 8,458,662 B2* | 6/2013 | Grechanik et al. | 717/124 |
| 8,495,085 B2* | 7/2013 | Cai et al. | 707/769 |
| 8,626,438 B2* | 1/2014 | Petzold et al. | 701/411 |
| 8,645,428 B2* | 2/2014 | Vion-Dury | 707/797 |
| 8,745,190 B2* | 6/2014 | Song et al. | 709/223 |
| 2004/0107402 A1* | 6/2004 | Seyrat et al. | 715/513 |
| 2005/0120031 A1* | 6/2005 | Ishii | 707/100 |
| 2005/0131642 A1* | 6/2005 | Adachi | 701/210 |
| 2005/0149471 A1* | 7/2005 | Lassalle | 707/1 |
| 2005/0182778 A1* | 8/2005 | Heuer et al. | 707/101 |
| 2005/0229158 A1* | 10/2005 | Thusoo et al. | 717/115 |
| 2006/0004858 A1* | 1/2006 | Tran et al. | 707/104.1 |
| 2006/0136435 A1* | 6/2006 | Nguyen et al. | 707/100 |
| 2007/0288907 A1* | 12/2007 | Olivier et al. | 717/129 |
| 2008/0052298 A1* | 2/2008 | Yeh | 707/100 |
| 2008/0120608 A1* | 5/2008 | Shetty et al. | 717/144 |
| 2008/0148141 A1* | 6/2008 | Heuer et al. | 715/234 |
| 2008/0288529 A1* | 11/2008 | Cheng et al. | 707/102 |
| 2009/0096645 A1* | 4/2009 | Yasuda et al. | 341/107 |
| 2009/0307664 A1* | 12/2009 | Huuck et al. | 717/124 |
| 2010/0318873 A1* | 12/2010 | Lin et al. | 714/752 |
| 2011/0098912 A1* | 4/2011 | Baselau et al. | 701/200 |
| 2011/0118971 A1* | 5/2011 | Petzold et al. | 701/200 |
| 2011/0122004 A1* | 5/2011 | Rekaya-Ben Othman et al. | 341/107 |
| 2011/0179390 A1* | 7/2011 | Morris | 715/854 |
| 2011/0289118 A1* | 11/2011 | Chen et al. | 707/803 |
| 2011/0302555 A1* | 12/2011 | Balasubramanian et al. | 717/113 |
| 2012/0005245 A1* | 1/2012 | Ruiz-Velasco | 707/822 |
| 2012/0023227 A1* | 1/2012 | Song et al. | 709/224 |
| 2012/0047113 A1* | 2/2012 | Weinberger et al. | 707/693 |
| 2012/0078942 A1* | 3/2012 | Cai et al. | 707/769 |
| 2012/0246624 A1* | 9/2012 | Halliday et al. | 717/129 |
| 2012/0254496 A1* | 10/2012 | Dedeoglu | 711/1 |
| 2013/0111452 A1* | 5/2013 | Schulze | 717/129 |
| 2013/0151565 A1* | 6/2013 | Vion-Dury | 707/797 |
| 2014/0101538 A1* | 4/2014 | Style | 715/234 |
| 2014/0223008 A1* | 8/2014 | Song et al. | 709/224 |

OTHER PUBLICATIONS

Silberschatz et al., Operating System Concepts with Java, Chapter 12: File System Implementation, pp. 1-25, 2003.*

* cited by examiner

COMPACT ENCODING OF NODE LOCATIONS

BACKGROUND OF THE INVENTION

With the increasing popularity of web-based applications, such as web services, more data is being organized, stored, transferred and displayed in structured documents such as Extensible Markup Language (XML) or HyperText Markup Language (HTML) files. For example, Business Process Execution Language (BPEL), based on XML, allows business processes and transactions to be specified in terms of web services. Elements in such structured documents are typically organized as nodes in a hierarchical or tree structure, which may be located using a location path from a root of the structure to the node to be located. Such a location path may use names of each node on the path. However the length of such name-based location path may increase rapidly as the names of the nodes on the location path increase, posing significant overhead in terms of both storage space and computing resource when the names of the nodes are long.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Embodiments of the present invention provide techniques for encoding location of a node in an object model or data model such as a document object model (DOM), a file system or a design model of an application. In an embodiment, an encoding for each node on a path from a root node of the object model to a destination node is generated based on an encoding scheme. In an embodiment, the encoding scheme is based at least in part on a type of the node and a position of the node, if the node is ordered or name of the node if the node is unordered. The type of a node may indicate whether the node is a leaf node and/or whether the node is ordered. The position of a node may indicate the relative order of the node among its sibling nodes, if any.

In an embodiment, the encoding scheme may encode each node on the path into one or more characters such as ASCII characters. In an example, a single ASCII character may be used to encode both the type and the position of the node. In another example, base-36 ASCII characters may be used to encode the position of a node. In an embodiment, an encoding of a node may include a minimal disambiguating prefix of the name of the node.

In an embodiment, the encoding of each node on the path from the root node to the destination node may be combined (e.g., concatenated) to form the location path for the destination node. On the other hand, given an encoded location path and a data model, the corresponding destination node may be located based on the encoding scheme used to encode the original location path. The encoding scheme described herein may be used to encode various entities. For example, in an embodiment, the encoding scheme may be used to encode breakpoint locations in an application. The encoded breakpoint location paths may be stored and used by a debugger to determine whether an execution of the application should be suspended. In an embodiment, the breakpoint location paths encoded using the methods described herein are compact in length reducing the amount of storage space and computing resource required from the debugger. In another embodiment, the encoding scheme may be used to encode file system paths in a file system.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION OF THE INVENTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Embodiments of the present invention provide techniques for encoding location of a destination node in a data structure such as a tree by encoding the path from the root of the data structure to the destination node. In an embodiment, each node on the location path is encoded according to an encoding scheme that encodes the node, based at least in part on a type and/or position associated with the node, into one or more characters such as ASCII characters. Such type/position-based encoding likely results in more space-efficient encoding than location paths expressed using names of the nodes on the path.

Figure 1:
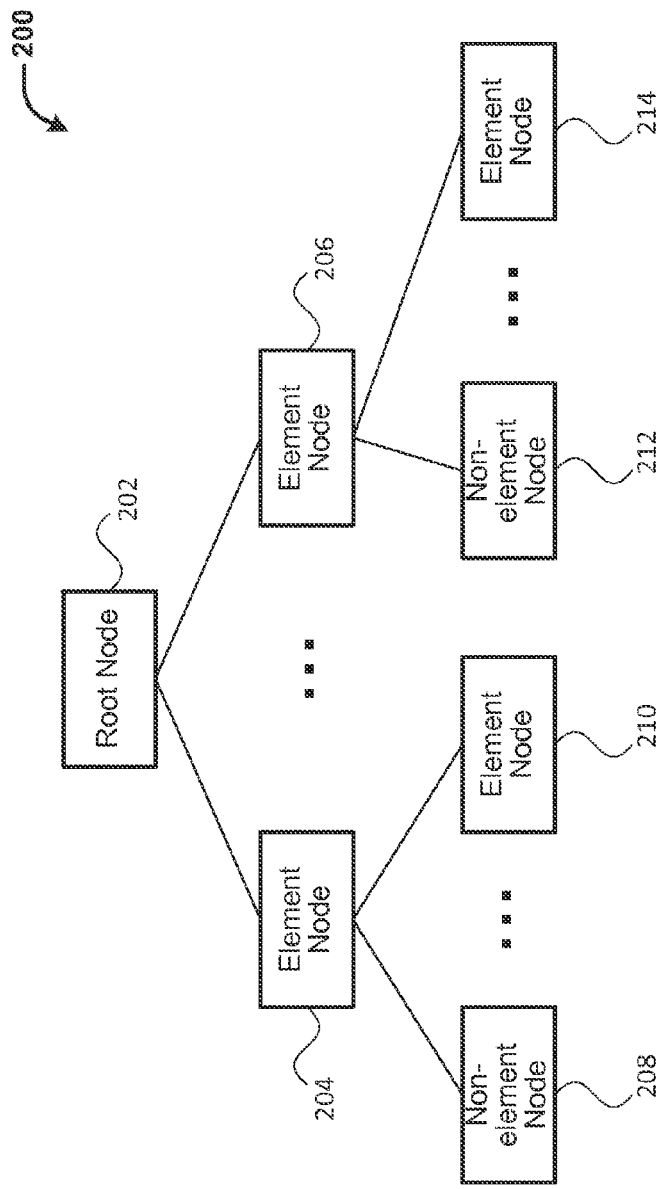
FIG. 1 illustrates an example data model of a document, in accordance with at least one embodiment.

FIG. 1 illustrates an example data model 100 of a document, in accordance with at least one embodiment. While the illustrated example uses XML and XPath constructs for illustrative purpose, the techniques described herein generally apply to any other data models such as Document Object Model (DOM). In this example, the content of a document is organized in a tree 100, for example, based on the XML tags in the document. A document order defines an order for the nodes in the tree 100, for example, based on the order of the first character of the XML representation of each node in the XML representation of the document. Thus, the root node 102 is the first node. Element nodes occur before their children nodes. A root node may have children nodes such as element nodes 104, 106 and non-element nodes (not shown). Element nodes may have children nodes that may include other element nodes 110, 114 and non-element nodes 108, 112. Non-element nodes may not have any children nodes. Examples of non-element nodes may include text nodes representing a block of character data (for example, as signaled by the character data (CDATA) XML tag), processing instruction nodes for processing instructions, comment nodes for comments, namespace nodes and attribute nodes. In an embodiment, namespace nodes and attribute nodes are unordered. For example, the relative orders of namespace nodes and attribute nodes may be implementation-specific. On the other hand, the other non-element nodes such as text nodes, processing instruction nodes and comment nodes may be ordered.

Figure 2:
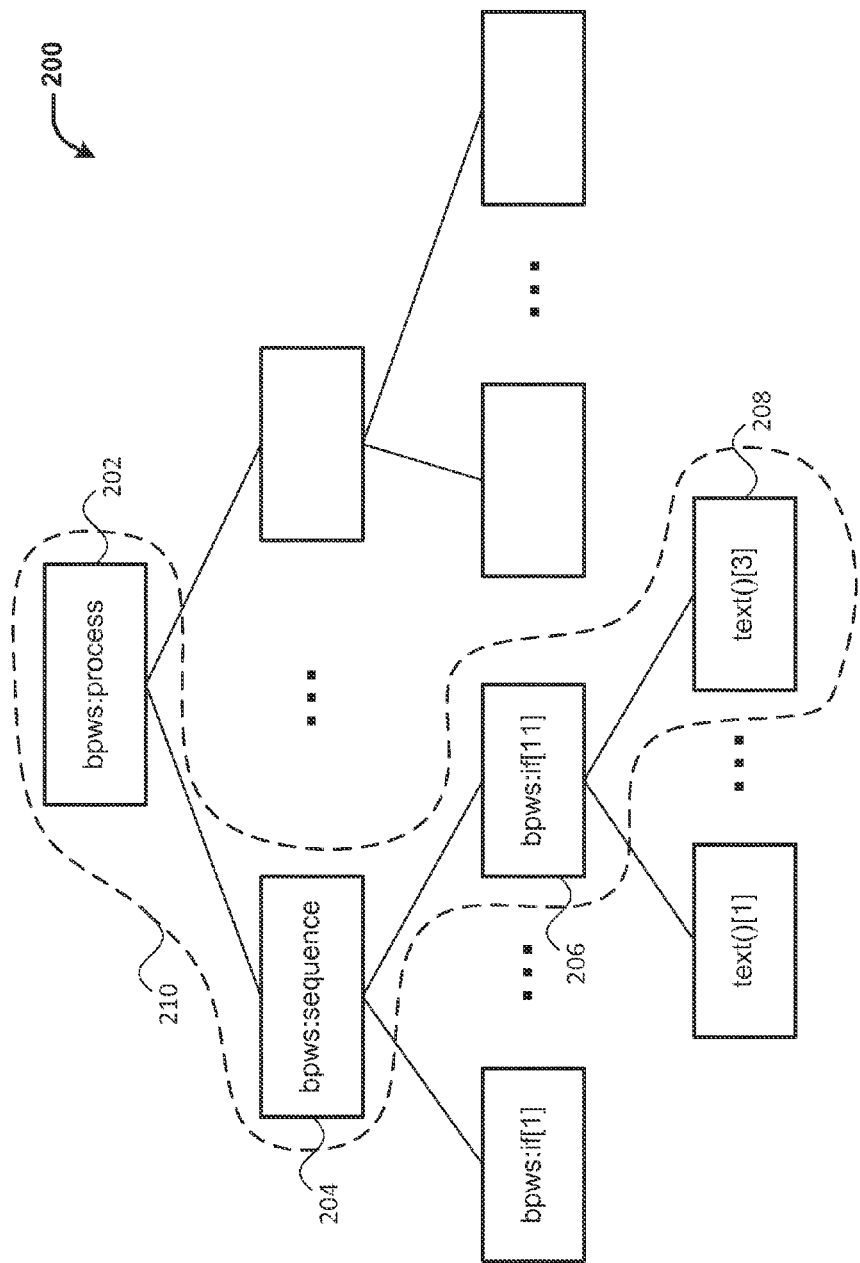
FIG. 2 illustrates portions of an example data model defining a BPEL process, in accordance with at least one embodiment.

In an embodiment, each given node in a document data model such as discussed in connection with FIG. 1 may be expressed or identified using a location path from the root node of the data model to the given node. The location path may comprise one or more location steps, each of which indicates a step to take to move from the current node towards the given node. FIG. 2 illustrates portions of an example data model 200 defining a BPEL process, in accordance with at least one embodiment. In this example, the root node 202 of the BPEL process has the name "bpws:process." The process may include an element node "bpws:sequence" 204 that defines a series of activities that are performed in a sequential order (such as receiving a message, invoking web services, sending a reply message). The sequence element node 204 may include multiple if statements which are ordered. For example, the 11th if statement may be expressed as "bpws:if[11]." The element node may have non-element children nodes such as text nodes discussed in connection with FIG. 1. The text nodes for a given element node may be ordered. Thus, the third text node of a given element node may be expressed as "text( )[3]." Using XPath, location of the text node 208 may be expressed by the location path 210 from the root node 202 to the text node 208. The location path 210 may be expressed in XPath as "/bpws:processibpws:sequence/bpws:if[11]/text( )[3]". This location path is 49 characters long and represents the third text node in the eleventh if statement in a sequence of the BPEL process. If each character is stored as one byte, at least 49 bytes are needed to store the above location path. Worse, if the node names include Unicode characters, two bytes may be required to store each character and thus 2×49=98 bytes may be required to store such a location path.

In some embodiments, node locations may be encoded to minimize the lengths of the location paths such as described above. In an embodiment, the location path of a node may be intermediately encoded as a sequence of indexes, separated by a separator. For example, the location path "/bpws:process/bpws:sequence/bpws:if[11]/text( )[3]" may be encoded as "1:3:11:3" to indicate that the first element child is selected, followed by the third element child, followed by the 11th element child, and followed lastly by the third child which may be an element node or a non-element node. Such an intermediate encoding may be further encoded according to Table 1 illustrated below. Note that the intermediate encoding (e.g., "1:3:11:3") is provided for illustration purpose and may or may not correspond to actual implementation. In other embodiments, the intermediate encoding may not require further encoding.

| Node Type | Index | Encoding |
| --- | --- | --- |
| Element | 1-26 | SEPARATORS_ELEMENT [index] |
| Element | >26 | SEPARATORS_ELEMENT [0] + index (base 36) |
| Ordered non-element | 1-18 | type + SEPARATORS_NON_ELEMENT [index] |
| Ordered non-element | >18 | type + SEPARATORS_NON_ELEMENT [0] + index (base 36) |
| Unordered non-element | N/A | '@' + {minimal non-ambiguous name} |

Table 1 illustrates an example encoding of node locations, in accordance with at least one embodiment.

The SEPARATORS_ELEMENT and SEPARATORS_NON_ELEMENT referenced in the above table may be implemented by the following character arrays.

```
static char SEPARATORS_ELEMENT [ ] = {
    ':',                                                    // overflow
                                                            separator
    'A','B','C','D','E','F','G','H','I','J','K','L','M',   // 13
    'N','O','P','Q','R','S','T','U','V','W','X','Y','Z'    // 13
};
static char SEPARATORS_NON_ELEMENT [ ] = {
    ';',                                                    // overflow
                                                            separator
    '[',']','<','>','~','!','#','&','=','+','(',')','_','-',// 13
    '{','}','.',',',';','/','\\',                           // 5
};
```

In an embodiment, the encoding of each location step in a location path may be based at least in part on the type of the node and relative position of the node among its siblings, if any. As illustrated by Table 1, for element nodes with an index between 1 to 26 (inclusive), the node location may be encoded using a single upper-case alphabet character from the SEPARATORS_ELEMENT character set. For example, a first child element node may be encoded simply as "A" and the third child element node may be encoded simply as "C" according to Table 1. Thus, the location path "/bpws:process, bpws:sequence/bpws:if[11]" (which may be encoded intermediately as "1:3:11") may be encoded by a much shorter character string "ACK". Where the index or position of an element node exceeds 26, an overflow separator character (e.g., ":" according to Table 1) may be used in conjunction with a base-36 encoding of the index. For example, the 143th child element node may be encoded as ":3z". Thus, an intermediate encoding of "1:3:11:143" may be encoded by "ACK:3z".

Still referring to Table 1, for ordered non-element nodes such as text nodes, comment nodes and processing instruction nodes as described in connection with FIG. 1, when the index is no more than 18, the node may be encoded using a type indicator and a character from the SEPARATORS_NON_ELEMENT data structure that corresponds to the index of the node. The type indicator may include one or more characters that uniquely identify the type of the non-element node. For example, type may be one of "t", "c" and "i" corresponding to text nodes, comment nodes and processing instruction nodes respectively. Thus, a text node "text( )[3]" may be encoded as "t<" according to Table 1, where "t" indicates that the type of the node is a text node and SEPARATORS_NON_ELEMENT [3] is '<'.

For ordered non-element nodes (e.g., text nodes, comment nodes and processing instruction nodes) where the index exceeds 18, an overflow separator character (e.g., ";" according to Table 1) may be used in conjunction with a base-36 encoding of the index. For example, an 143th child text node may be represented as "t;3z". Note in this example, the overflow separator for non-element node (e.g., ";") is different from the overflow separator for the element nodes (e.g., ":") to distinguish the two cases.

In some cases where only one type of ordered non-element nodes is considered, such as the case for BPEL processes breakpoints (where only text nodes are considered), the encoding may be simplified to omit encoding the type of the nodes. The encoding for ordered non-element nodes may be simplified as illustrated below in Table 2. Accordingly, "/bpws:process/bpws:sequence/bpws:if[11]/text( )[3]" may be encoded as "ACK<".

| Node Type | Index | Encoding |
| --- | --- | --- |
| Ordered non-element | 1-18 | SEPARATORS_NON_ELEMENT [index] |
| Ordered non-element | >18 | SEPARATORS_NON_ELEMENT [0] + index (base 36) |

Table 2 illustrates an example encoding of node locations for ordered non-element nodes, in accordance with at least one embodiment.

Still referring to Table 1, for unordered non-element nodes such as attribute nodes or namespace nodes as described in connection with FIG. 1, the node location may be encoded using a distinct character such as '@' and a portion of the name of the node that distinguishes it from the sibling nodes. In an embodiment, the distinguishing portion may include a minimal prefix of the name that distinguishes the node. For example, an element node may be associated with two attribute nodes "language" and "length." The encoding for "language", according to Table 1, may be "@la", the minimal prefix that distinguishes "language" from "length."

A benefit of encoding based on node type and index instead of node name is that the length of the encoded location path does not necessarily increase as the node name increases, as long as the type and/or index of the nodes remain the same. In other embodiments, mappings similar to that illustrated in Table 1 may be provided between type, index or other characteristics of a node and a set of encoding characters, symbols and the like. For example, instead of using ASCII characters, the encoding may use non-ASCII characters. In some embodiments, the encoding scheme used may depend on the shape (e.g., wide versus deep) of the data model. In other embodiments, the encoding scheme used may depend on the types of nodes in the data model. For example, the encoding scheme may seek to minimize the encoding for the most frequently occurring types of nodes (e.g., element nodes). In various embodiments, the encoding schemes may be derived based on statistical analysis and/or optimization techniques.

Figure 3:
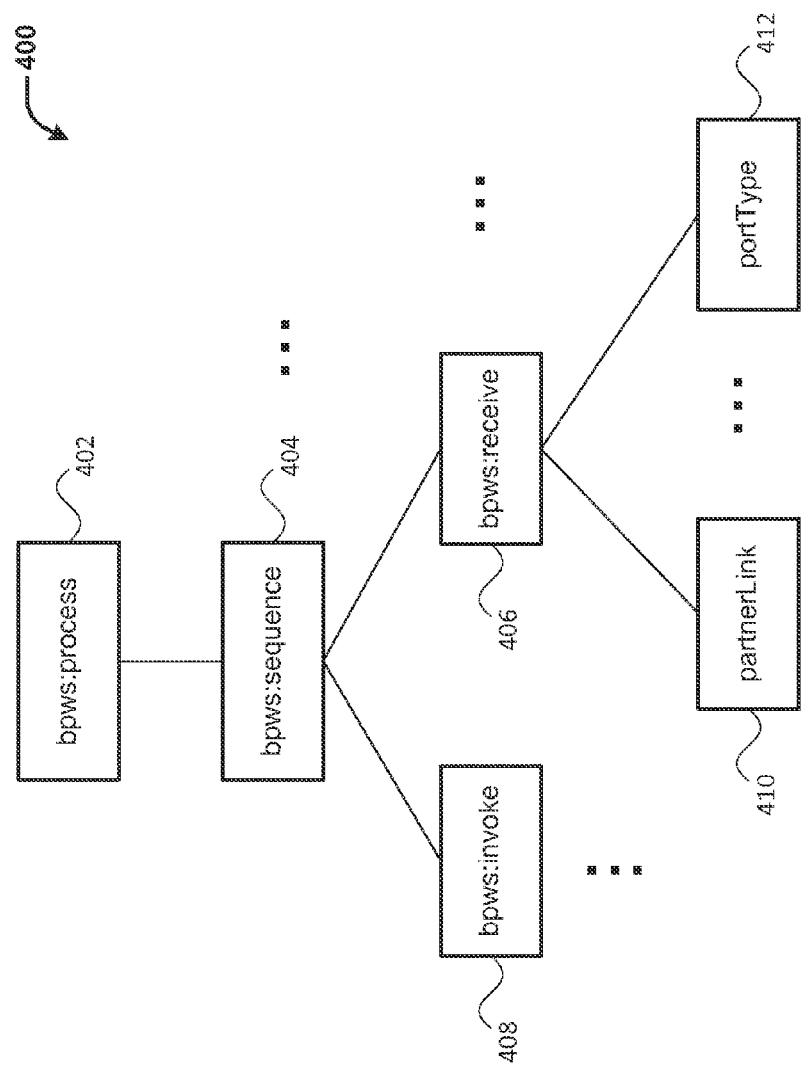
FIG. 3 illustrates portions of an example data model defining a BPEL process, in accordance with at least one embodiment.

FIG. 3 illustrates portions of another example data model 300 defining a BPEL process, in accordance with at least one embodiment. In this example, the BPEL process has defined a sequence 304 of operations including invoking 308 a web service and receiving 306 a response for the invoked operation. The receive element node 306 may have a set of attributes including "partnerLink" 310 and "portType" 312. Using XPath, the location path for the "portType" attribute node 312 may be "/bpws:process/bpws:sequence/bpws:receive/portType" which is 49 characters long. Using methods described above, the location path may be encoded simply as "AAB@po" where bpws:sequence 304 is the first element child of the root node bpws:process 302, bpws:receive 306 is the second element child of bpws:sequence 304 and where "po" is the shortest distinguishing prefix for the portType 312 attribute of bpws:receive 306. The encoded location path "AAB@po" is only six characters long, compared with the 49-character XPath expression.

In various embodiments, the encoding techniques described herein may be used to encode location paths to entities other than in document data objects or nodes as described above. In an embodiment, file paths in a file system may be encoded using the methods described herein. For example, assuming the folders and files in the file system are ordered, for example, by creation date, size, file name or the like, each folder or file in a file path may be encoded using the position or index of the folder or file. For example, a file path "C:\Program Files\Windows Media Player\wmplayer.exe" may be encoded as "1:20:5:50" assuming that "c:" drive is the first drive, "Program Files" is the $20^{th}$ child folder under "c:", "Windows Media Player" is the $5^{th}$ folder under "Program Files" and "wmplayer.exe" is the $50^{th}$ file under "Windows Media Player". The encoded file path is only nine characters long, compared with the original 50-character file path. In another embodiment, the position of a file or folder may be encoded similar to the encoding of element nodes shown in Table 1. Thus, the above file path may be encoded as "ATE: 1e" according to Table 1. In this case, the encoded file path is further reduced to only six characters long.

Figure 4:
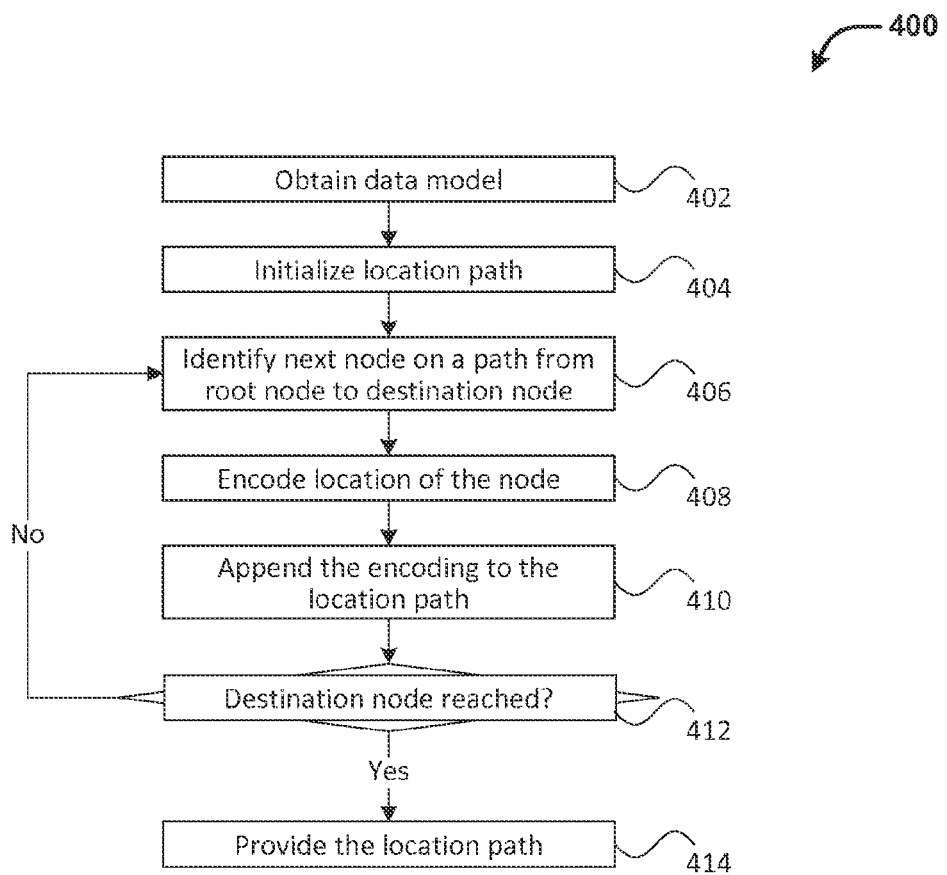
FIG. 4 illustrates an example process for encoding location path of a node, in accordance with at least one embodiment.
Figure 8:
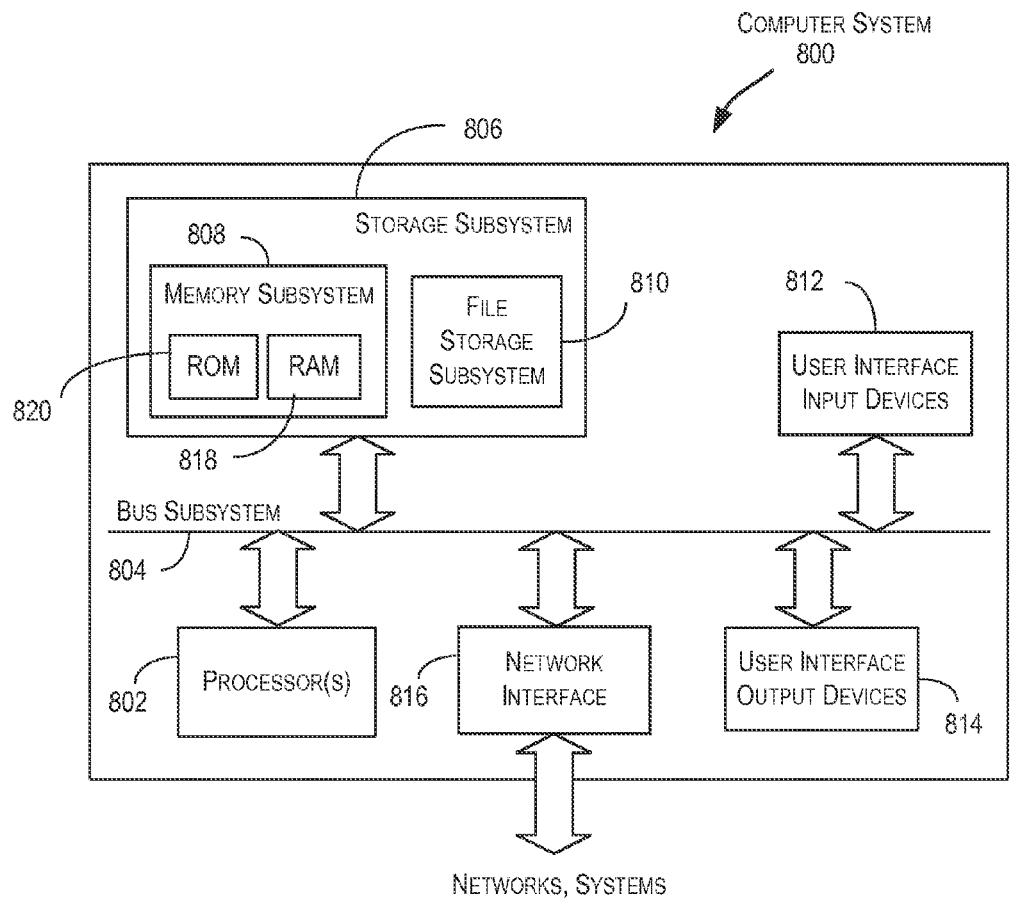
FIG. 8 is a simplified block diagram of a computer system that may be used to practice an embodiment of the present invention.

FIG. 4 illustrates an example process 400 for encoding location path of a node, in accordance with at least one embodiment. Some or all of the process 400 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations can be combined in any order and/or in parallel to implement the processes. In various embodiments, process 400 may be used to traverse a path from a root node of a hierarchical representation (data model) of a structured document or system to a destination node to encode the path. Aspects of such traversal may be performed in a recursive or iterative manner. In some embodiments, aspects of process 400 may be implemented by a computer system such as illustrated in FIG. 8.

In an embodiment, process 400 includes obtaining 402 a data model. In some embodiments, obtaining the data model may include parsing or causing the parsing of a structured document such as an XML document to derive a tree or hierarchical data structure or data model such as illustrated in FIGS. 2 and 3. In other embodiments, the data model may be restored (e.g., in memory) based on information about previously generated data model or data structure. Such information may be stored in cache, configuration file, local or remote data stores and the like.

In an embodiment, process 400 includes initializing 404 a location path for a destination node in the data model. In an embodiment, the location path is initialized to be an empty string. In another embodiment, the location path may be initialized to include a predetermined string, such as location path to the root of the data model (e.g., path to the parent directory).

In an embodiment, process 400 includes identifying the next node on the path from a root node of the data model to the destination path. Various path finding algorithms (such as Dijkstra's algorithm or variations thereof) may be used to determine such a path. In an embodiment, process 400 includes encoding 408 the location of the next node on the path (starting from the root node) using encoding methods described herein. In some embodiments, the encoding may be based at least in part on the position of the node and/or the type of the node. In an embodiment, such as illustrated by the encoding of element nodes in Table 1 and the encoding of non-element nodes in Table 2, a single character may be used to encode both the type and the position of a node.

In an embodiment, process 400 includes appending 410 the encoding of the node to the location path. For example, if the encoding of the current node is "C" and the location path is currently "AB", the result of appending the encoding to the location path would be "ABC". In some embodiments, the encoding of the node may be stored in a data structure before being appended, for example, at the end of process 400 before the location path is returned.

In an embodiment, process 400 includes determining 414 whether the destination node has been reached. If so, the location path comprising encoded node locations for nodes from the root node to the destination node may be provided 414 to a user or a process that invokes process 400. Otherwise, process 400 includes looping back to identifying 406 the next node on the path from the root node to the destination node to encode its location as described above.

Figure 5:
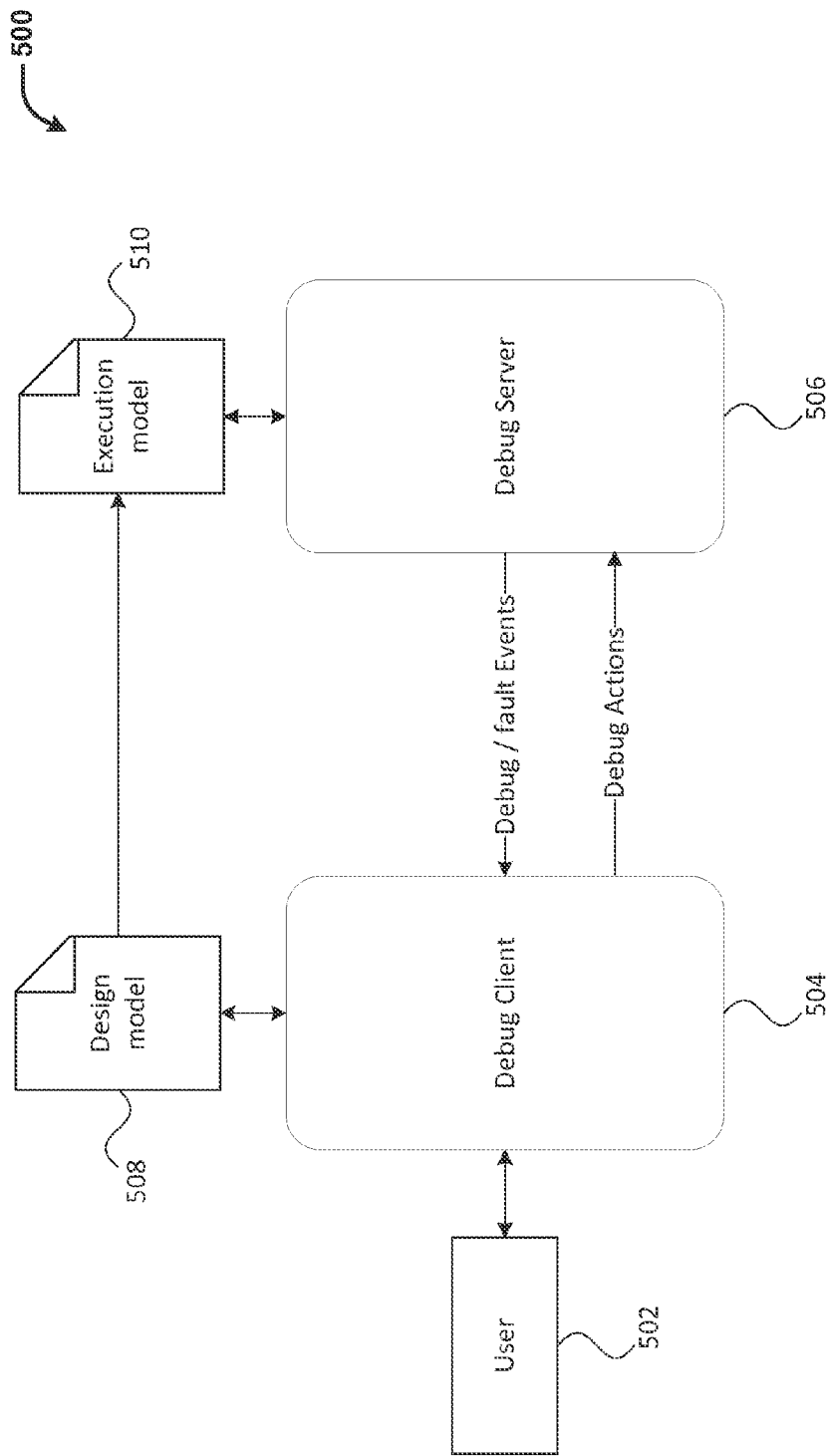
FIG. 5 illustrates an example environment where the methods described herein may be implemented, in accordance with at least one embodiment.

In some embodiments, the encoding techniques described herein may be used to efficiently encode breakpoint locations in an application. FIG. 5 illustrates an example environment 500 where the methods described herein may be implemented, in accordance with at least one embodiment. In this example, one or more users 502 may connect to a debug client 504 for debugging an application. In various embodiments, the users 502 may include software developers, business process designers, deployment engineers, system administrators and the like or processes or systems operated by them. In various embodiments, the application to be debugged may include any computer-executable program such as a BPEL process as discussed above or other service-oriented architecture—(SOA) based application.

In an embodiment, the debug client 504 may provide an interface such as a graphical user interface, a web or web service interface, a command-line tool and the like, for a user to perform various debug-related operations such as starting, pausing and resuming the running of an instance of the application to be debugged, viewing and/or editing contextual information (e.g., variables, properties) during the execution of the application, modifying, building and/or deploying the application and the like. In an embodiment, the debug client 504 may be implemented as part of an integrated development environment (IDE). In some embodiments, the debug client may be executed by a computing device or system operated by the user 102, a front end service provided by a service provider or the like. In various embodiments, the user 502 may connect to the debug client 504 locally or remotely over a network such as the Internet, local area network ("LAN"), wide area network ("WAN"), wireless data network or any other data network.

In an embodiment, the debug client 504 may communicate with a debug server 506 which may be configured to provide runtime support or infrastructure for the execution and debugging of an application. For example, the server component 506 may provide one or more service engines for running BPEL processes, business rules invocation and the like, policy management, business activity monitoring, identity-based security and the like. Additionally, the debug server component 506 may be configured to manage the execution of an instance of an application to be debugged and providing debugging information to the debug client 504.

In some embodiments, debug server 506 may be implemented by one or more virtual, logical or physical computer systems or any combination thereof. In some embodiments, debug server 506 and debug client 504 may be implemented by the same or different computer systems. The debug server 506 and debug client 504 may be co-located on the same physical computer or commute remotely over a network such as the Internet, LAN, WAN, wireless data network or any other data network.

In an embodiment, the debug client 504 may be configured to maintain a design model 508 of the application. The design model 508 may include the source code, metadata and the like that collectively represents the design of the application. In an embodiment, the design model 508 may include one or more structured documents (such as XML files). In an embodiment, the design model may be compiled to an executable model 510 by the debug client 504 or debug server 506. The executable model may include an executable or binary version of the application that may be executable by the debug server 506.

In an embodiment, during compilation of the design model 508 to the execution model 510, the design model 508 may be parsed to extract location paths to breakpoint locations within the design model 508. The break locations may correspond to potential locations where breakpoints may be set. In an embodiment, the breakpoint location paths may be embedded in the execution model 510. As the execution model 510 is executed by the debug server 506, each encoded breakpoint location encountered may be compared with a list of active breakpoint locations set by the user to determine whether the execution should be suspended. Such a list of active breakpoint locations may be provided by the debug client 504 based on user input via a user interface. In various embodiments, both the breakpoint locations embedded in the execution model 510 and the list of active breakpoint locations may be encoded using the encoding techniques described herein to reduce the storage space required and the process time to determine a match.

If a breakpoint is determined to have been reached, debug server 506 may suspend the execution of the application and provide the debug client with notification of breakpoint. The notification may include the encoded location path of the breakpoint reached. Here, a compact location path means less data to transmit between debug client 504 and debug server 506. Using encoded breakpoint location, debug client 504 may be configured to determine the corresponding breakpoint location in the design model. Based on the determination, the debug client 504 may display the current breakpoint location in a graphical manner.

Besides breakpoint locations, debug server 506 may be configured to inform debug client 504 of other debug events and information such as the reach of pre-defined condition, tracing events, user-defined or system-generated fault events and the like. In some embodiments, debug client 504 may process information received from the debug server 506. For example, the debug client 504 may display contextual information related to the current execution context (e.g., call stack, variables, user-defined conditions, breakpoint location). In addition, debug client 504 may provide the debug server 506 with instructions or messages for debug actions (e.g., stepping into or stepping over a subroutine, continue with execution, terminate execution and the like) based at least in part on input from the user 502.

Figure 6:
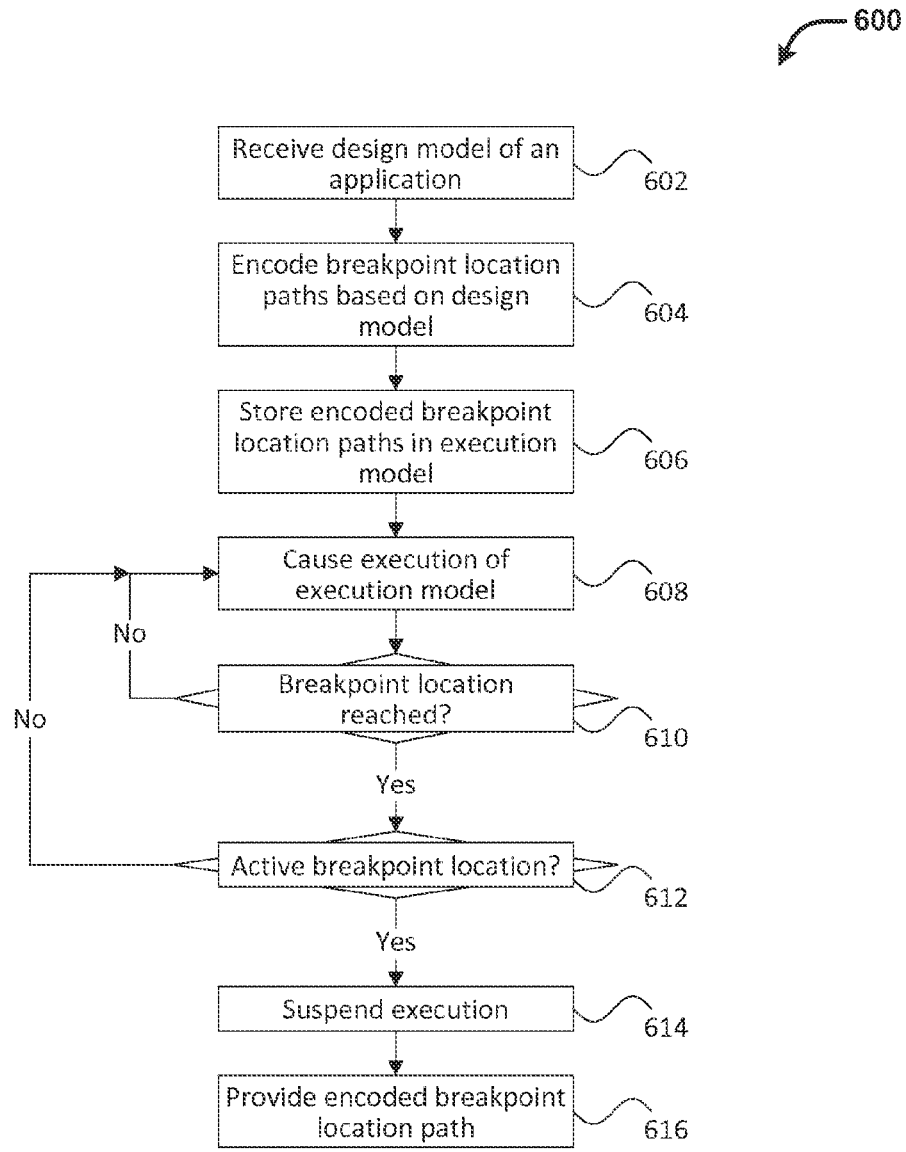
FIG. 6 illustrates an example process for debugging an application, in accordance with at least one embodiment.

FIG. 6 illustrates an example process 600 for debugging an application, in accordance with at least one embodiment. In some embodiments, process 600 may be implemented by a debug server, such as debug server 506 discussed in connection with FIG. 5, to detect breakpoints set for an application and to suspend execution of the application.

In an embodiment, process 600 includes receiving 602 a design model for an application. The design model may include the source code, metadata, configuration files and the like. Typically, the design model is in a human-readable format such as XML. The design model may be received with a request to deploy the application, for example, to a debug server such as described in connection with FIG. 5.

In an embodiment, process 600 includes encoding 604 breakpoint location paths based on the received design model. In some embodiments, at least a part of the design model (e.g., an XML file defining a BPEL process) may be parsed to generate a data structure or data model similar to the data model illustrated in FIGS. 1-3. The data model may be traversed to generate, for each node in the data model where a breakpoint may be set, a location path using a method similar to that described in connection with process 400 of FIG. 4. For example, in some cases, breakpoints may only be set at element nodes or text nodes. In such cases, encoded location paths may be generated for each of the element nodes and text nodes in the data model but not for the other nodes.

In an embodiment, process 600 includes storing 606 the encoded breakpoint location paths in an execution model. The execution model may include an executable file compiled from the design model. In some embodiments, the encoded breakpoint location paths may be embedded in the execution model to replace corresponding instructions at the breakpoint locations. In other embodiments, the instructions at the breakpoint locations may be replaced with system calls, a debug process or invalid instructions that cause exceptions to be thrown and handled by a debug process.

In some embodiments, process 600 includes causing 608 execution of the execution model (e.g., an executable), for example, in response to an invocation of the application, such as a web service call to a web service application, a user request to launch the application from an IDE or the like.

In an embodiment, process 600 includes determining 610, during the prosecution of the application, whether a breakpoint location has been reached, for example, by determining that an embedded breakpoint location path is reached. If a breakpoint location is not reached, the process 600 includes continuing execution 608 of the application. Otherwise, if it is determined that a breakpoint location has been reached, process 600 includes determining 612 whether the breakpoint location is associated with an active breakpoint. In various embodiments, a user may be allowed to add, remove, enable and disable breakpoints at various breakpoint locations in the design model of the application, for example, using a user interface or application programming interface (API) provided by a debug client such as described in connection with FIG. 5. Such user-specified breakpoint settings may be provided to a debug server in a configuration file and/or as part of the design model. In some embodiments, location paths to the user-specified breakpoint locations may be encoded using a method similar to that discussed in connection with process 400 in FIG. 4. The encoded user-specified breakpoint location paths may be made accessible to a debug server such as debug server 506 discussed in connection with FIG. 5. In an embodiment, determining 612 whether a given breakpoint location is active includes determining whether the encountered encoded breakpoint location path (embedded in the execution model) is one of the encoded user-specified breakpoint location paths. Here, compact encoding of the location paths means less processing time to determine a match between an encountered breakpoint location path and a user-specified breakpoint location. In an alternative embodiment, the execution model is embedded with only encoded breakpoint location paths that are active (e.g., enabled). In such an embodiment, when an embedded encoded breakpoint location path is encountered during execution of the execution model, it is known that the encountered breakpoint location is active. If an active breakpoint location is determined 612 not to have been reached, process 600 includes continuing the execution 608 of the execution model. Otherwise, the execution may be suspended 614 and provide 616 the encoded location path of the encountered breakpoint, for example, to a debug client such as described in connection with FIG. 5. In some embodiments, other information related to the context of current execution of the application may be provided as well. Such information may include call stack information, variable information and the like.

In some embodiments, a system implementing process 600 (e.g., a debug server) may receive and execute instructions or messages, for example, from a debug client, to resume execution of the application in various manners, including stepping into execution of components or subroutines, step over such components or subroutines, continue execution until the next active breakpoint is hit, terminate the execution or the like.

Figure 7:
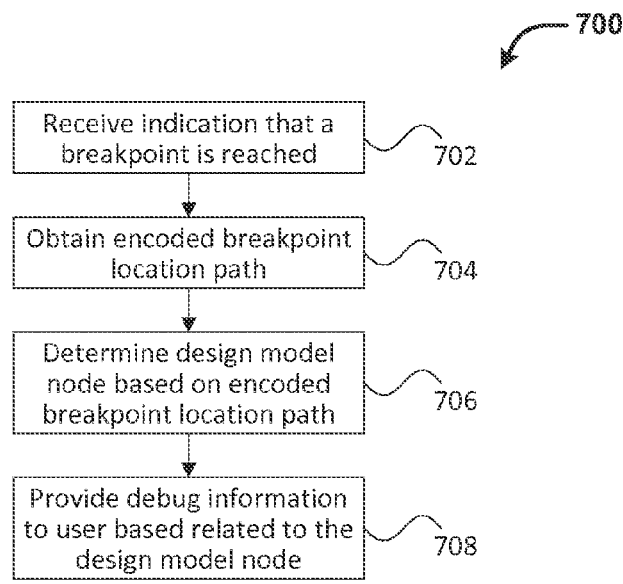
FIG. 7 illustrates an example process for debugging an application, in accordance with at least one embodiment.

FIG. 7 illustrates an example process 700 for debugging an application, in accordance with at least one embodiment. In some embodiments, process 700 may be implemented by a debug client, such as debug client 504 discussed in connection with FIG. 5, to handle a breakpoint event and to provide a user with debug information related to the suspended application.

In an embodiment, process 700 includes receiving 702 an indication that a breakpoint is reached during an execution of an application. Such an indication may be a message sent by a process similar to process 600 discussed in connection with FIG. 6. In an embodiment, process 700 includes obtaining 704 an encoded breakpoint location path for the breakpoint location that is reached. Such information may be obtained from the received indication or separately from the indication.

In an embodiment, process 700 includes determining 706 a design model node that is associated with the encoded breakpoint location path. Generally, a system implementing process 700, such as a debug client, has access to a design model, including source code (e.g., in XML or other programming languages), metadata, configuration files and the like. Elements or components in the design model may be organized in a data model such as illustrated in FIGS. 1-3. Given an encoded location path and the data model, the node designated by the location path may be identified by traversing the data model according to navigation instructions decoded from the encoded location path. The encoded location path may be decoded based at least in part on the encoding algorithm that was used to encode the node location. For example, given an encoded location path of "AAB@po" and the encoding algorithm illustrated in Table 1, decoded navigation instructions may include "select the first element node, then select the second element node and finally select the attribute that starts with po." Applying such navigation instructions to a data model such as data model 400 illustrated in FIG. 3 starting from the root node 402, the attribute node 412 may be reached.

In an embodiment, the system implementing process 700 may maintain a map between encoded location path and unencoded location paths or references to nodes in the design model. Such unencoded location paths or references may include XPath expressions, for example. The map may be used for convenience only and may not be required in some cases.

Once the design model node is identified, process 700 includes providing debug information related to the identified design model node to a user. In some embodiments, process 700 may include displaying the current breakpoint location in a graphical representation of the application in a graphical user interface. For example, a graphical representation of a component of the application (e.g., a web service invocation in a BPEL process) may be highlighted or otherwise made different to indicate that it is where the suspended application is currently at. In some embodiments, additional information related to the context for the suspended application (e.g., call stacks, variables, user-defined conditions) may also be provided to the user in a graphical or non-graphical manner.

As noted above, numerous variations and enhancements are considered as being within the scope of the present disclosure. For instance, as noted above, a node may be expressed as a path in a document. For instance, given a document (or DOM for the document) and a path, the corresponding node for which the path was computed may be determined. This allows, for example, one to have a file (e.g., XML file) in memory that can be parsed. A first instantiation of the document in memory may be used to generate paths from a given node (or from all nodes). The file (e.g., XML file) may be parsed in another environment (e.g., on a different computer) and a second instantiation of the document can be used with the paths generated from the first instantiation to retrieve nodes from the second instantiation that are logically equivalent to the nodes in the first instantiation. Other variations are also considered as being within the scope of the present disclosure.

FIG. 8 is a simplified block diagram of a computer system 800 that may be used to practice an embodiment of the present invention. The computer system 800 may be used, for instance, to compose, send, distribute, and/or receive electronic messages. Computer system 800 may serve as a processing system and/or a client system depicted in FIG. 2. As shown in FIG. 1, computer system 800 includes a processor 802 that communicates with a number of peripheral subsystems via a bus subsystem 804. These peripheral subsystems may include a storage subsystem 806, comprising a memory subsystem 808 and a file storage subsystem 810, user interface input devices 812, user interface output devices 814, and a network interface subsystem 816.

Bus subsystem 804 provides a mechanism for letting the various components and subsystems of computer system 800 communicate with each other as intended. Although bus subsystem 804 is shown schematically as a single bus, alternative embodiments of the bus subsystem may utilize multiple busses.

Network interface subsystem 816 provides an interface to other computer systems, networks, and portals. Network interface subsystem 816 serves as an interface for receiving data from and transmitting data to other systems from computer system 800. The network interface subsystem 816 may be used, for example, to send and receive electronic messages over a network.

User interface input devices 812 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 800. A user may use an input device to compose content for electronic messages and/or to specify and/or exclude recipients, in accordance with various embodiments.

User interface output devices 814 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 800. Content of electronic messages may be displayed using output devices 814.

Storage subsystem 806 provides a computer-readable medium for storing the basic programming and data constructs that provide the functionality of the present invention. Software (programs, code modules, instructions) that, when executed by a processor, provide the functionality of the present invention may be stored in storage subsystem 806. These software modules or instructions may be executed by processor(s) 802. Storage subsystem 806 may also provide a repository for storing data used in accordance with the present invention, for example, the data stored in the diagnostic data repository. For example, storage subsystem 806 provides a storage medium for persisting one or more ontologies. Storage subsystem 806 may comprise memory subsystem 808 and file/disk storage subsystem 810.

Memory subsystem 808 may include a number of memories, including a main random access memory (RAM) 818 for storage of instructions and data during program execution and a read-only memory (ROM) 820, in which fixed instructions are stored. File storage subsystem 810 provides persistent (non-volatile) storage for program and data files, and may include a hard disk drive, a floppy disk drive along with associated removable media, a Compact Disk Read-Only Memory (CD-ROM) drive, an optical drive, removable media cartridges, and other like storage media.

Computer system 800 can be of various types, including a personal computer, a portable computer, a workstation, a network computer, a mainframe, a kiosk, a mobile device, a tablet device, and a server or any other data processing system. Due to the ever-changing nature of computers and networks, the description of computer system 800 depicted in FIG. 8 is intended only as a specific example for purposes of illustrating the preferred embodiment of the computer system. Many other configurations having more or fewer components than the system depicted in FIG. 8 are possible.

Figure 9:
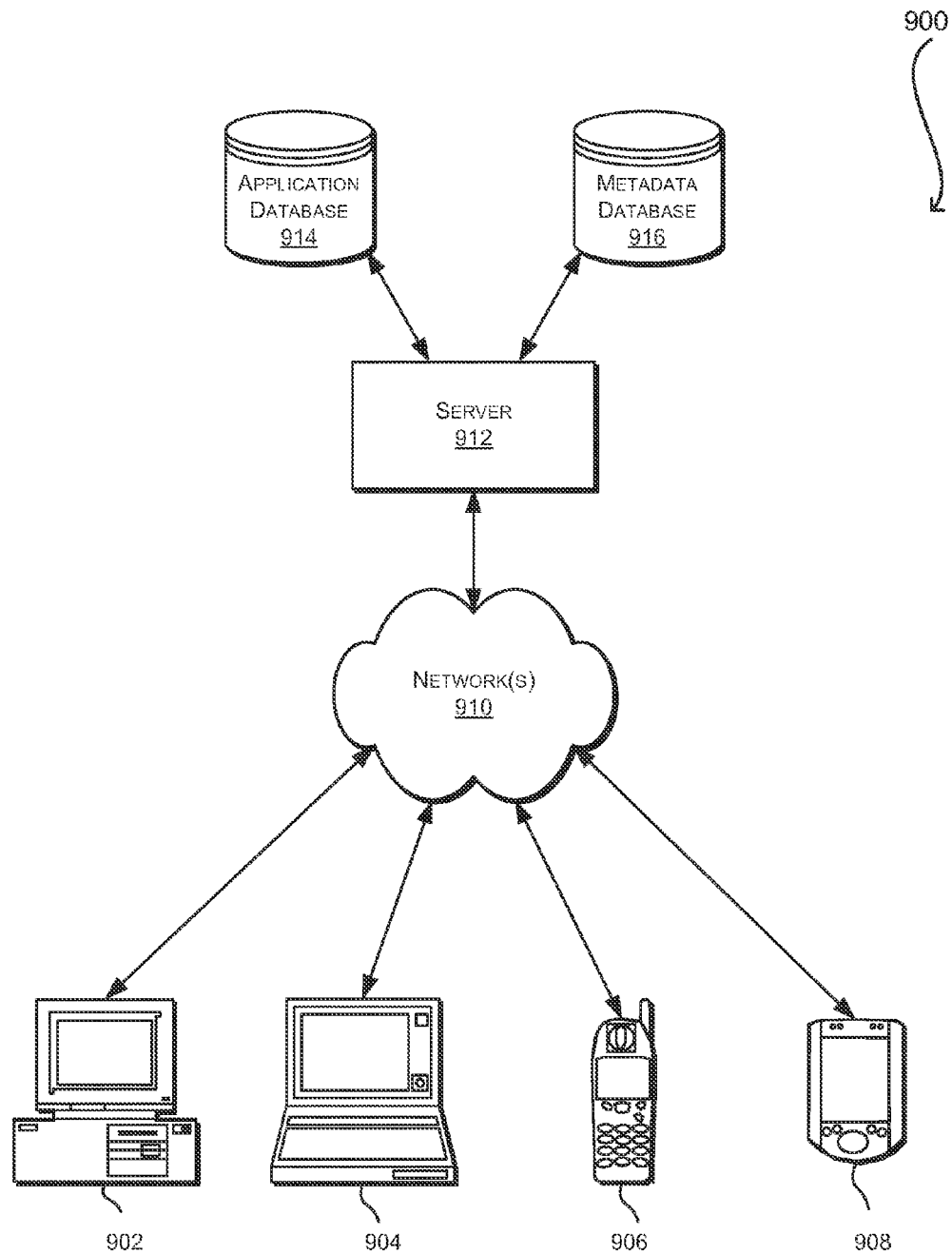
FIG. 9 is a simplified block diagram illustrating components of a system environment that may be used in accordance with an embodiment of the present disclosure.

FIG. 9 is a simplified block diagram illustrating components of a system environment 900 that may be used in accordance with an embodiment of the present disclosure. As shown, system environment 900 includes one or more client computing devices 902, 904, 906, 908, which are configured to operate a client application such as a web browser, proprietary client (e.g., Oracle Forms), or the like. In various embodiments, client computing devices 902, 904, 906, and 908 may interact with a server 912.

Client computing devices 902, 904, 906, 908 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including, without limitation, the variety of GNU/Linux operating systems). Alternatively, client computing devices 902, 904, 906, and 908 may be any other electronic device, such as a thin-client computer, Internet-enabled gaming system, and/or personal messaging device, capable of communicating over a network (e.g., network 910 described below). Although example system environment 900 is shown with four client computing devices, any number of client computing devices may be supported. Other devices, such as devices with sensors, etc., may interact with server 912.

System environment 900 may include a network 910. Network 910 may be any type of network familiar to those skilled in the art that can support data communications using any of a variety of commercially-available protocols, including, without limitation, TCP/IP, SNA, IPX, AppleTalk, and the like. Merely by way of example, network 910 can be a local area network (LAN), such as an Ethernet network, a Token-Ring network and/or the like; a wide-area network; a virtual network, including, without limitation, a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 900 also includes one or more server computers 912 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 912 may be adapted to run one or more services or software applications described in the foregoing disclosure. For example, server 912 may correspond to a server for performing processing described above according to an embodiment of the present disclosure.

Server 912 may run an operating system including any of those discussed above, as well as any commercially available server operating system. Server 912 may also run any of a variety of additional server applications and/or mid-tier applications, including HTTP servers, FTP servers, CGI servers, Java servers, database servers, and the like. Example database servers include, without limitation, those commercially available from Oracle, Microsoft, Sybase, IBM and the like.

System environment 900 may also include one or more databases 914, 916. Databases 914, 916 may reside in a variety of locations. By way of example, one or more of databases 914, 916 may reside on a non-transitory storage medium local to (and/or resident in) server 912. Alternatively, databases 914, 916 may be remote from server 912, and in communication with server 912 via a network-based or dedicated connection. In one set of embodiments, databases 914, 916 may reside in a storage-area network (SAN) familiar to those skilled in the art. Similarly, any necessary files for performing the functions attributed to server 912 may be stored locally on server 912 and/or remotely, as appropriate. In one set of embodiments, databases 914, 916 may include relational databases, such as databases provided by Oracle, that are adapted to store, update, and retrieve data in response to SQL-formatted commands.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope.

Illustrative methods and systems for providing statistically triggered data placement are described above. Some or all of these systems and methods may, but need not, be implemented at least partially by architectures such as those shown in FIGS. 1-9 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A computer-implemented method of encoding location of a node in a hierarchy, comprising:

generating, by a computer system configured with executable instructions, an encoding for each node on a path from a root node on the path to a destination node on the path based at least in part on an encoding scheme that does not utilize a name of each node on the path to encode each node, the encoding scheme based at least in part on a type of each node and a position of each node, but not the name of each node, the position of each node on the path identifying an order for each node among other nodes of a same hierarchical level, the generated encoding for each node including a single American Standard Code for Information Interchange (ASCII) character to represent each node on the path; and generating an encoded location path for the destination node at least by combining the single ASCII character of each node on the path from the root node to the destination node to form a set of ASCII characters as the encoded location path, the set of ASCII characters comprising the single ASCII character of each node on the path.

2. The computer-implemented method of claim 1, wherein the hierarchy is a document object model (DOM).

3. The computer-implemented method of claim 1, wherein combining the encoding of each node includes concatenating the encoding of each node.

4. The computer-implemented method of claim 1, wherein the encoding for each node is represented by a combination of the single ASCII character and one or more other ASCII characters.

5. The computer-implemented method of claim 1, wherein the encoding scheme includes mapping at least a node type and a position to the single ASCII character.

6. The computer-implemented method of claim 1, wherein the encoding scheme is based at least in part on base-36 encoding.

7. The computer-implemented method of claim 1, wherein the encoded location path represents a debugging breakpoint location.

8. A computer system for debugging an application, comprising:
one or more processors; and
memory, including instructions executable by the one or more processors to cause the computer system to at least:
obtain a data object model for the application, the data object model associated with a root node of a plurality of nodes and one or more other nodes of the plurality of nodes, at least one of the plurality of nodes in the data object model being a breakpoint node;
obtain an encoding for each node of the plurality of nodes on a path from the root node of the data object model to the breakpoint node based at least in part on an encoding scheme that does not utilize a name of each node on the path to encode each node, the encoding scheme based at least in part on a type of each node and a position of each node, but not the name of each node, wherein the position of each node on the path identifies an order for each node among other nodes of a same hierarchical level; and
obtain an encoded breakpoint location path associated with the breakpoint node at least by combining the encoding of each node on the path from the root node to the breakpoint node.

9. The computer system of claim 8, wherein the instructions further cause the computer system to store the encoded breakpoint location path for the breakpoint node.

10. The computer system of claim 8, wherein the instructions further cause the computer system to determine whether the breakpoint node has been reached in an execution of the application based at least in part on the encoded breakpoint location path associated with the breakpoint node.

11. The computer system of claim 8, wherein the instructions further cause the computer system to identify the breakpoint node in the data object model based at least in part on a corresponding encoded breakpoint location path.

12. The computer system of claim 8, wherein the application is based on service-oriented architecture (SOA).

13. One or more non-transitory computer-readable storage media having stored thereon executable instructions that, when executed by one or more processors of a computer system, cause the computer system to at least:
obtain an object model comprising one or more nodes;
generate an encoding for each node of the one or more nodes on a path from a root node on the path to a destination node on the path based at least in part on an encoding scheme that does not utilize a name of each node on the path to encode each node, the encoding scheme based at least in part on a type of each node and a position of each node, but not the name of each node, wherein the position of each node on the path identifies an order for each node among other nodes of a same hierarchical level; and
generate an encoded location path for the destination node at least by combining the encoding of each node on the path from the root node to the destination node.

14. The one or more computer-readable storage media of claim 13, wherein the object model represents a file system and the one or more nodes represent one or more files or folders in the file system.

15. The one or more computer-readable storage media of claim 13, wherein the instructions further cause the computer system to identify the destination node based at least in part on the encoded location path and the encoding scheme.

16. The one or more computer-readable storage media of claim 13, wherein the object model includes a document object model.

17. The one or more computer-readable storage media of claim 13, wherein each node is an ordered node.

18. The one or more computer-readable storage media of claim 13, wherein the type of each node indicates at least whether each node is a leaf node or whether each node is ordered.

* * * * *